United States Patent [19]

Hanks

[11] 3,722,035

[45] Mar. 27, 1973

[54] METHOD FOR REMOVING MEAT FROM THE SHELLS OF BIVALE MOLLUSKS

[76] Inventor: Fletcher Hanks, P.O. Box 70, Easton, Md. 21601

[22] Filed: Jan. 27, 1971

[21] Appl. No.: 110,047

[52] U.S. Cl. .............................. 17/48, 17/51, 17/74
[51] Int. Cl. ............................................. A22c 29/00
[58] Field of Search ............... 17/74, 48, 51; 209/164

[56] References Cited

UNITED STATES PATENTS

| | | | |
|---|---|---|---|
| 2,608,716 | 9/1952 | Harris | 17/51 |
| 3,479,281 | 11/1969 | Kikindai et al. | 209/164 X |
| 3,203,034 | 8/1965 | Matzer et al. | 17/74 |

Primary Examiner—Lucie H. Laudenslager
Attorney—Robert U. Geib, Jr.

[57] ABSTRACT

Bivalve mollusks, such as clams, are, with with meat intact, heated sufficiently to obtain the partial opening of the shells and the withdrawal of at least one end of the adductor muscle from the shell; and while the bivalve mollusk is in this condition it is permitted to fall downwardly into and through a body of water which is devoid of a quantity of salt which would have any deleterious effect upon the meat of the bivalve, or which would make the expended water objectionable for municipal sewage operations; then there is introduced into the lower portion of the body of water compressed air of sufficient magnitude and so located as to provide upwardly rising air bubbles which are capable of assisting in the separation of the meat from the shell and the flotation of the meat upwardly into the upper portion of the body of water while permitting the empty shells to continue to fall downwardly therein; the separated meats are removed from the upper portion of the body of water; and the empty shells are independently removed from the lower portion thereof.

2 Claims, 3 Drawing Figures

PATENTED MAR 27 1973

INVENTORS
FLETCHER HANKS

BY
ROBERT U. GEIB, JR.
ATTORNEY

METHOD FOR REMOVING MEAT FROM THE SHELLS OF BIVALE MOLLUSKS

The present invention relates to the removal of meat from the shells of bivalve mollusks; and particularly clams, although not limited thereto.

Bivalve mollusks, such as clams, oysters, scallops and mussels, have two main shells or valves which are joined together by a hinge and held shut by adductor muscles which function to open and close the valves which, when open, pump in sea water containing food etc. One class of bivalve, which includes oysters, surf clams, and scallops, contains one adductor muscle and is known as monomyrian. Another class, which includes soft shell clams and mussels, contain two adductor muscles and is known as dimyrian.

It is, of course, well-known that when bivalve mollusks are removed from the water, the adductor muscles thereof (whether one or two) become taut and pull the two shells together against the force which is exerted by a ligament in the hinge.

Since the oldest and manual method of removing the meat from the shells of bivalve mollusks requires substantial skill and application of considerable strength, numerous machines have heretofore been proposed for replacing it.

Some of these prior art proposals rely on the preliminary application of heat to at least partially open the shell, followed by flotation in brine, according to which the shells are intended to fall to the bottom of the flotation device with the meats floating upwardly to be skimmed from the top.

It has been found that brine solutions are not only expensive, but difficult to maintain, particularly since they are unacceptable to some municipal sewage systems.

But regardless of the immediate foregoing, brine solutions undesirably toughen the meat of the bivalve.

It is among the objects of the present invention to provide a novel method for efficiently removing the meat of bivalve mollusks from their shell in such manner that the meat or flesh is physically undamaged and untoughened as would be the case were a brine or saline solution to be used.

Another object of the invention is the provision of a novel method possessing the foregoing advantages which may be effectively performed by relatively inexpensive apparatus which is simple and easy to manufacture, install, and maintain.

Still another object is to provide a method which not only possesses the aforementioned highly desirable characteristics, but which may be rapidly conducted by relatively unskilled operators who require little or no supervision.

The foregoing and other objects and advantages will become more readily understood after consideration of the following description and accompanying drawings in which like reference characters designate like parts and wherein.

Figure 1:
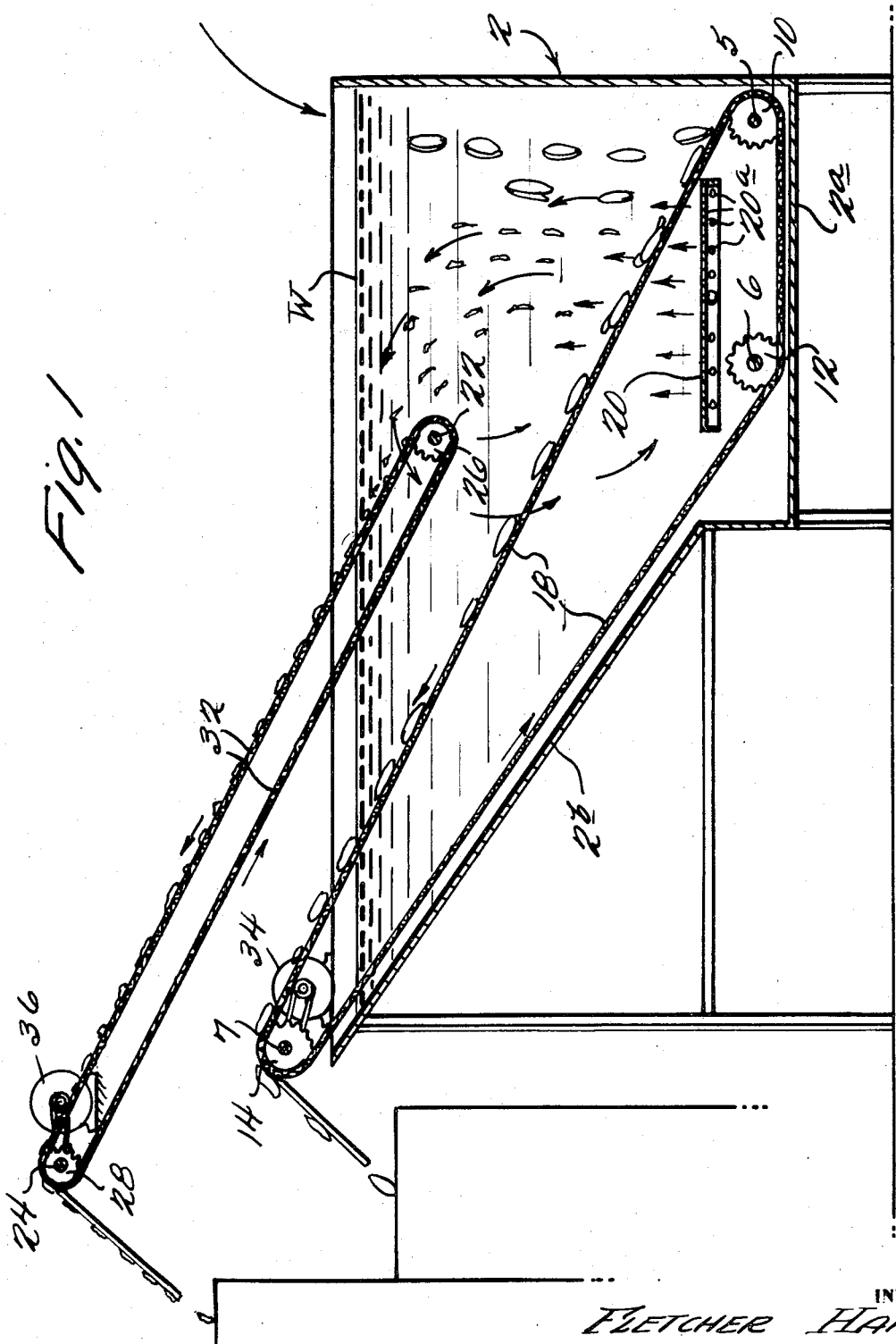
FIG. 1 is a longitudinal elevational view, partly in section, and illustrating an apparatus which embodies the teachings of the present invention.
Figure 2:
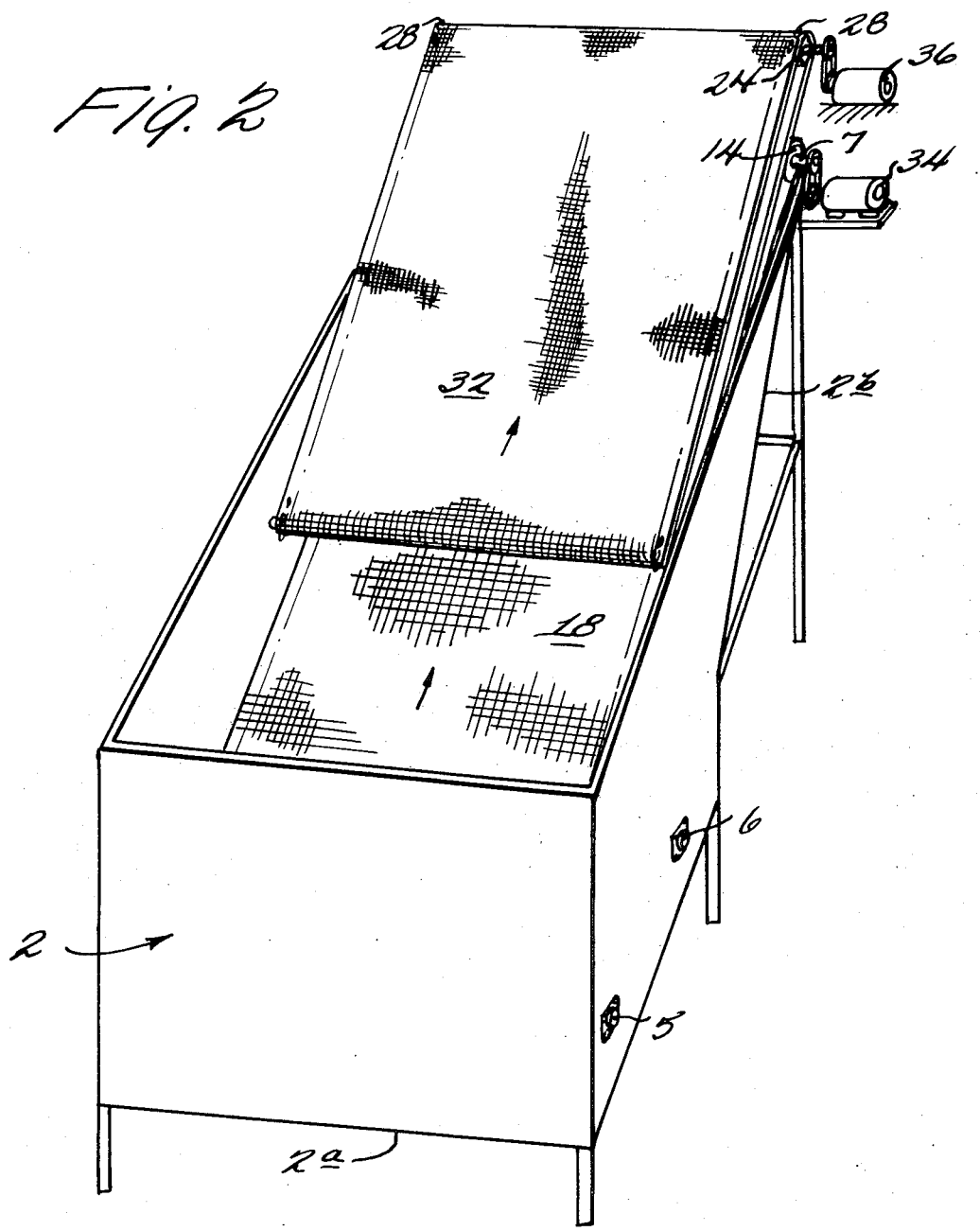
FIG. 2 is a perspective view of the apparatus of FIG. 1.
Figure 3:
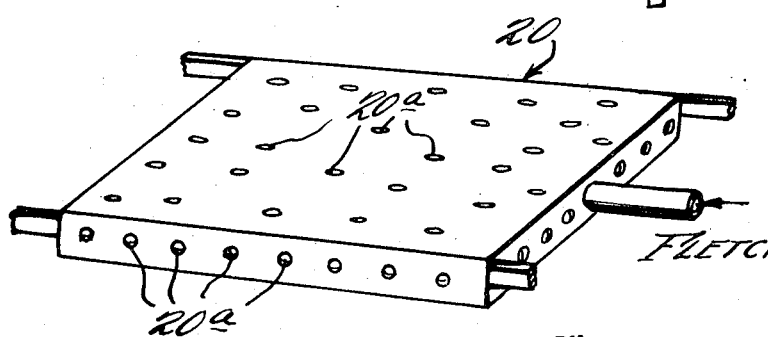
FIG. 3 is a perspective view of a device for supplying compressed air in such manner as to cause air bubbles to float upwardly in the flotation tank, as will be described hereinafter.

Referring more particularly to the drawings, the numeral 2 generally designates a flotation tank having a main body portion 2a of substantially rectangular formation and an upwardly tapering portion 2b.

It is essential to the practice of the method of the invention that the flotation tank contain a body of water W which is not briny and which does not contain a quantity of salt that could have any deleterious effect upon the meat of the bivalve or which would make the expended water after the operation objectionable for municipal sewage disposal purposes.

Disposed adjacent the bottom of the main body portion 2a of the tank 2 is a pair of substantially spaced horizontally extending and parallel rotatable shafts 5 and 6, the latter being located relatively adjacent the bottom of the upwardly tapering portion 2b.

Suitably mounted above the upper end of the upwardly tapering portion 2b of the tank is a third horizontally extending rotatable shaft 7 which is in parallelism with the lower rotatable shafts 5 and 6.

Each of the shafts 5, 6 and 7 carries a plurality of suitably spaced sprockets, as shown at 10, 12 and 14, respectively.

The sprockets 10, 12 and 14 on the rotatable shafts 5, 6 and 7, respectively are in alignment; and the teeth thereof adapted to enter the apertures or interstices of a relatively wide, woven stainless steel endless belt 18.

According to the foregoing construction and arrangement, a sizable unobstructed space is provided between the shafts 5 and 6, which carry the sprockets 10 and 12; and between the upper and lower flights of the woven stainless steel endless belt 18. Within this space there is disposed a device 20 which is connected with a suitable source of compressed air and dispenses air bubbles which create considerable turbulence of the water W in the tank 2 and rise to the surface thereof. This device 20 may, for the purpose stated, take any of a number of forms such as a horizontally disposed inverted metallic pan with holes 20a in the planar portion thereof, or a perforated tubular manifold. The holes 20a may acceptably be 1 inch in diameter and spaced at desired intervals.

Disposed in the tank 2, and below, but relatively adjacent, the surface of the water therein, is a rotatable shaft 22 which extends in parallelism with the previously described shafts 5, 6 and 7; said shaft being positioned at or adjacent a vertical plane containing the lower end of the upwardly tapering portion 2b of the tank.

Disposed above the rotatable shaft 7, and outwardly thereof in a direction which is remote with respect to the tank 2 is a rotatable shaft 24.

Each of the shafts 22 and 24 carries a plurality of suitably spaced sprockets, as at 26 and 28; and the teeth of these sprockets enter the apertures of a woven, stainless steel endless belt 32.

The rotatable shafts 7 and 24 are driven by adjacently disposed motors 34 and 36, respectively, through suitable gearing, or otherwise, as desired.

As indicated earlier herein, the present invention contemplates the heating of bivalve mollusks sufficiently to obtain the withdrawal of at least one of the adductor muscles from the shell.

After being so heated, and partly shucked, the bivalve mollusks are introduced, mechanically or otherwise, to the water W in the tank 2, preferably at or adjacent the point indicated by the arrow at the top of the rightkhand end of the tank as viewed in FIG. 1. That is to say, at a point which is considerably spaced from the lower end of the woven stainless steel endless belt conveyor 32 which is strung around the shaft 22 and its sprockets 26.

When so introduced to the tank 2, the initially heated, and partly shucked, bivalve mollusks, move downwardly in the tank toward the lower end of the upper flight of the stainless steel endless belt conveyor 18.

The device 20 for supplying compressed air is provided at a number of points in the lower portion of the water in the tank 2 and is constructed and arranged to cause upward turbulence through the interstices of the woven stainless steel endless belt 18 which is sufficient to separate from the bivalve shell meats which have either already been disconnected from said shells, or which are adhering very lightly thereto; and to move the same upwardly in the water W to a point where they will be pulled onto the woven stainless steel endless belt conveyor 32.

From the upper end of the woven stainless steel endless belt conveyor 32 the separated meats are dumped into a suitable container, or onto another conveying instrumentality.

The shells from which the meats have been removed continue in their downward movement to fall upon the upper flight of the woven stainless steel endless belt conveyor 18, with which they move to the upper end thereof, to be dumped into a suitable container, or onto another conveying device.

As indicated earlier herein, it is essential to the present invention that the flotation media comprises water which is supplied in the lower portion thereof with upwardly rising air bubbles to the extent set forth earlier herein; and is so devoid of brine etc. that no toughening of the meats of the bivalve mollusks takes place.

Having thus described the invention, what I claim as new and desire to secure by Letters Patent is:

1. The method of removing the meat from the shell of a bivalve mollusk which includes
    conditioning the bivalve mollusk in such manner that it is induced to partially open its shell and withdraw at least one end of its adductor muscle from the shell;
    causing the bivalve mollusk while so conditioned to fall downwardly and partially through a body of liquid which is essentially water that is devoid of a quantity of salt which could have an appreciable deleterious effect upon the meat of the bivalve mollusk;
    injecting into the lower portion of the aforementioned body of liquid compressed air which is under sufficient pressure and so distributed as to cause the formation from beneath the falling bivalve mollusks of upwardly rising air bubbles which expend sufficient energy to assist in the separation of the meat from the shell and cause the flotation of the separated meat upwardly into the upper portion of the body of liquid while permitting the shell to fall downwardly therein;
    removing the separated meat of the bivalve mollusk from the upper portion of the body of liquid; and
    independently removing the shell of the bivalve mollusk from the lower portion of the body of liquid.

2. The method of claim 1 wherein the conditioning means comprises the application of heat to the bivalve mollusk.

* * * * *